(12) United States Patent
Seegel et al.

(10) Patent No.: US 9,908,299 B2
(45) Date of Patent: Mar. 6, 2018

(54) CONNECTING PORT ARRANGEMENT FOR USE IN AN APPARATUS FOR PRODUCING A COMPOSITE MATERIAL COMPONENT

(71) Applicant: Airbus Operations (GmbH, Hamburg (DE)

(72) Inventors: Hauke Seegel, Hamburg (DE); Claus Fastert, Hamburg (DE); Paulin Fideu, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 660 days.

(21) Appl. No.: 14/534,377

(22) Filed: Nov. 6, 2014

(65) Prior Publication Data

US 2015/0123322 A1    May 7, 2015

(30) Foreign Application Priority Data

Nov. 6, 2013 (EP) .................................... 13191761

(51) Int. Cl.
| | |
|---|---|
| *B29C 47/40* | (2006.01) |
| *B29C 70/54* | (2006.01) |
| *B29C 70/44* | (2006.01) |
| *B29C 33/00* | (2006.01) |
| *B29K 105/08* | (2006.01) |
| *B29K 263/00* | (2006.01) |

(52) U.S. Cl.
CPC ........ *B29C 70/548* (2013.01); *B29C 33/0061* (2013.01); *B29C 70/44* (2013.01); *B29K 2105/08* (2013.01); *B29K 2263/00* (2013.01)

(58) Field of Classification Search
None
See application file for complete search history.

(56) References Cited

U.S. PATENT DOCUMENTS

| | | | |
|---|---|---|---|
| 4,816,106 A | * | 3/1989 | Turris ................ B29D 99/0003 156/285 |
| 5,242,651 A | | 9/1993 | Brayden et al. |
| 2007/0023572 A1 | | 2/2007 | Muller et al. |

FOREIGN PATENT DOCUMENTS

| | | |
|---|---|---|
| CN | 1906084 | 1/2007 |
| DE | 102004001078 | 7/2005 |
| DE | 102007062111 | 7/2009 |

OTHER PUBLICATIONS

European Search Report, dated Apr. 4, 2014.
Airtech Europe S.A. et al, "Airtech-catalogue en ligne", Feb. 15, 2010.

* cited by examiner

*Primary Examiner* — Monica Huson
(74) *Attorney, Agent, or Firm* — Greer, Burns & Crain Ltd.

(57) ABSTRACT

A connecting port arrangement for use in an apparatus for producing a composite material component comprising a base member attached to a surface of a foil adapted to seal a mold of the apparatus for producing a composite material component. The base member is provided with a channel extending therethrough. The connecting port arrangement further comprises a punch member adapted to be inserted into the channel formed in the base member and provided with a cutting device suitable to cut at least one opening into the foil.

18 Claims, 6 Drawing Sheets

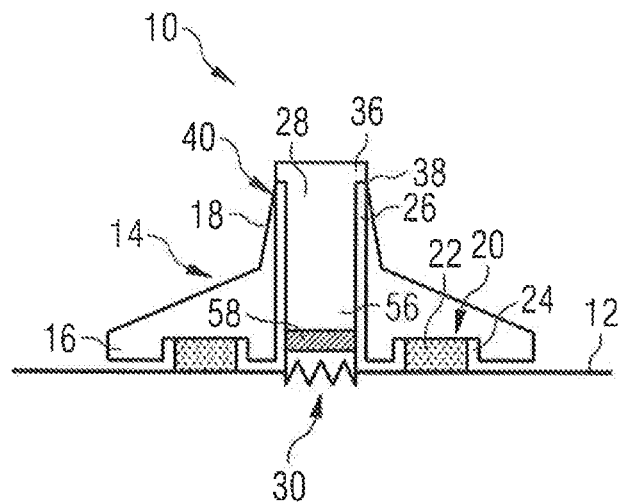
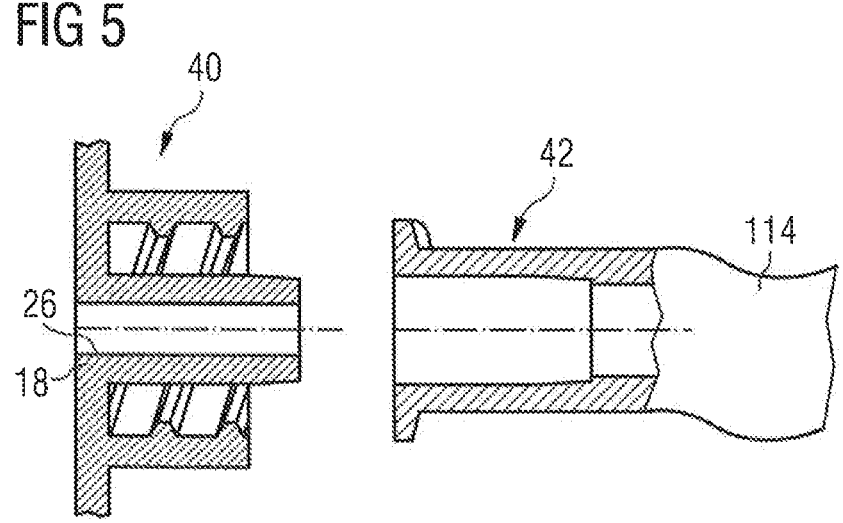

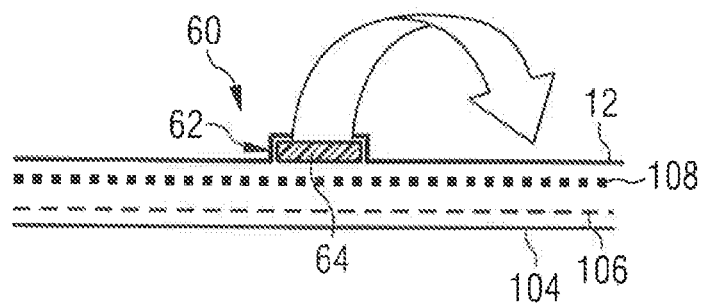
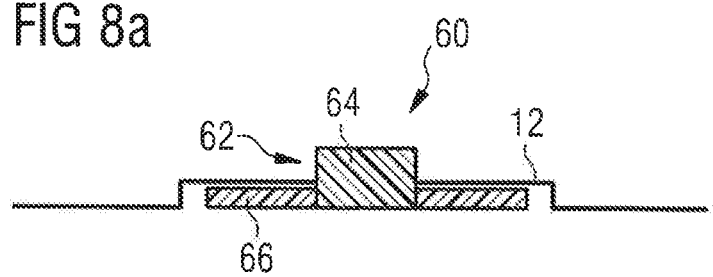
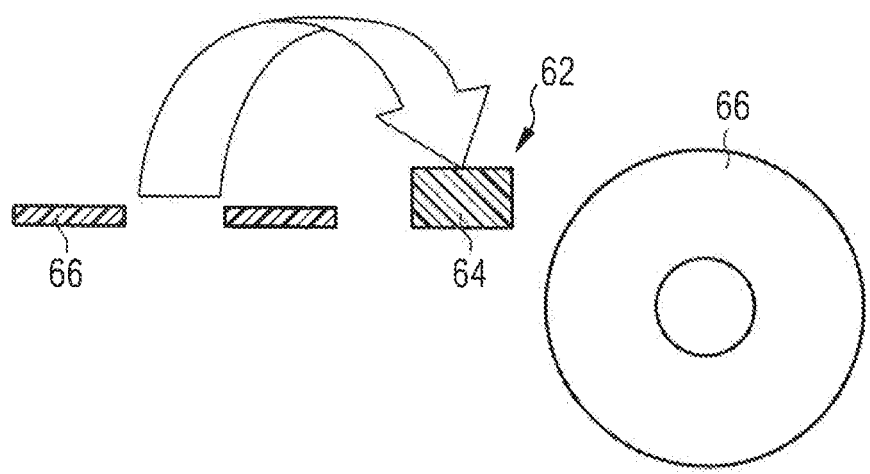

CONNECTING PORT ARRANGEMENT FOR USE IN AN APPARATUS FOR PRODUCING A COMPOSITE MATERIAL COMPONENT

CROSS-REFERENCES TO RELATED APPLICATIONS

This application claims the benefit of the European patent application No. 13 191 761.9 filed on Nov. 6, 2013, the entire disclosures of which are incorporated herein by way of reference.

BACKGROUND OF THE INVENTION

The invention relates to a connecting port arrangement for use in an apparatus for producing a composite material component, in particular a composite material aircraft component. Further, the invention relates to an apparatus and a method for producing a composite material component, in particular a composite material aircraft component.

In aircraft construction, efforts are increasingly being made to use as load-bearing components which are composed wholly or partly of fiber-reinforced composite materials, for example carbon fiber-reinforced plastics (CFRP). For example, DE 10 2007 062 111 A1 describes a transverse support structure which is composed of carbon fiber-reinforced plastic and serves to support the individual panels of an aircraft floor system for separating a passenger cabin from a cargo compartment arranged below the passenger cabin. Furthermore, it is known, for example from DE 10 2004 001 078 A1 or CN 1906084 A, to provide aircraft fuselage segments with a skin which is designed with a sandwich construction and made of fiber-reinforced composite materials.

For producing aircraft components from fiber-reinforced composite materials, a vacuum infusion process or a vacuum assisted resin transfer molding (RTM) process may be used, wherein reinforcing fibers in the form of single fibers, fiber prewovens or fiber prepregs are arranged inside a mold and the mold thereafter is sealed by means of a vacuum foil. A thermoset plastic material, for example an epoxy resin material, is injected into the mold via infusion hoses which are connected to copper pipes breaking through the vacuum foil in a sealed manner. Within the mold, the thermoset plastic material finally is cured under an elevated pressure and/or an elevated temperature so that a composite material with a matrix made of cured thermoset plastic material and reinforcing fibers embedded in the matrix is obtained. In order to exhibit the thermoset plastic material received within the mold to the desired elevated pressure and/or elevated temperature, the mold may be disposed between heated press plates. Alternatively, an autoclave process may be used to manufacture fiber-reinforced composite material aircraft components under an elevated pressure and/or an elevated temperature.

SUMMARY OF THE INVENTION

The invention is directed at an object of providing a connecting port arrangement for use in an apparatus for producing a composite material component which allows a high quality composite material component, in particular a high quality composite material aircraft component to be produced in an efficient manner. Further, the invention is directed at an object of providing an apparatus and a method for efficiently producing a high quality composite material component, in particular a high quality composite material aircraft component.

A connecting port arrangement for use in an apparatus for producing a composite material component comprises a base member which is attached to a surface of a foil. The foil is adapted to seal a mold of the apparatus for producing a composite material component. In particular, the foil may be suitable to seal the mold against the environment in such a manner that a pressure which is lower than the ambient pressure may be established and maintained within the mold. The mold may be any mold which is suitable for use in an infusion process, in particular a vacuum infusion process or a RTM process for producing components, in particular aircraft components, from fiber-reinforced composite materials. The mold may be suitable to receive reinforcing fibers in the form of single fibers, fiber prewovens or fiber prepregs. Further, the mold may be suitable for receiving a liquid plastic material. The mold may be loaded with the reinforcing fibers and thereafter may be sealed by means of the foil. A reduced pressure may then be generated within the mold, for example by connecting the mold to a vacuum source of the apparatus for producing a composite material component. The liquid plastic material may then be introduced into the mold, wherein the reduced pressure within the mold allows trapped air to be removed from the liquid plastic material. Hence, the liquid plastic material may be evenly distributed within the mold. The liquid plastic material may, for example, be a thermoset plastic material, in particular a resin material such as an epoxy resin material which might be cured within the mold, if necessary, under an elevated pressure and/or an elevated temperature so as to form a composite material with a matrix made of the cured thermoset plastic material and reinforcing fibers embedded in the matrix.

The base member of the connecting port arrangement is provided with a channel extending therethrough. The channel may, for example, have a circular cross-section and may extend in a direction substantially perpendicular to the surface of the foil. The base member may be provided with only one channel extending therethrough. It is, however, also conceivable to provide the connecting port arrangement with a base member wherein a plurality of channels are formed. The base member may, for example, be made of a plastic material, in particular a plastic material which may be processed by injection molding allowing the base member to be manufactured in a simple and cost-effective manner. It is, however, also conceivable to use different materials for manufacturing the base member.

The connecting port arrangement further comprises a punch member which is adapted to be inserted into the channel formed in the base member. The punch member may have a cross-sectional shape that is adapted to the shape of the cross-section of the channel. In case the channel has a circular cross-section, the punch member preferably also has a circular cross-section, wherein the punch member preferably has an outer diameter which is smaller than an inner diameter of the channel, thus allowing the punch member to be inserted into the channel and to be displaced relative to the base member.

The punch member is provided with a cutting device suitable to cut at least one opening into the foil. The at least one opening cut into the foil by means of the punch member may be connected to a vacuum source, for example a vacuum pump, of the apparatus for producing a composite material component which allows the generation of a reduced pressure within the mold sealed by the foil. Alternatively, the at least one opening cut into the foil by means of the punch member may be connected to a liquid plastic material source of the apparatus for producing a composite material component so as to allow liquid plastic material to be supplied from the liquid plastic material source to the mold via the at least one opening cut into the foil. In case the base member comprises more than one channel extending therethrough, a plurality of openings may be cut into the foil either by only one punch member which is successively inserted into the channels formed in the base member or by a plurality of punch members associated with the channels formed in the base member. The openings cut into the foil then may be connected to a vacuum source or a liquid plastic material source of the apparatus for producing a composite material component as desired.

The base member of the connecting port arrangement may be placed on the surface of the foil at any desired location such that a breakthrough through the foil may also be formed at any desired location. Hence, fixed pipes breaking through the foil at predetermined locations can be dispensed with, allowing an infusion process or a RTM process for producing components, in particular aircraft components, from fiber-reinforced composite materials to be carried out in a particularly flexible manner. Further, since the at least one opening is cut into the foil by means of the punch member of the connecting port arrangement, a defined cutting process can be performed ensuring that reinforcing fibers placed within the mold sealed by the foil are not damaged during the cutting process. This allows high quality composite material components to be produced in a reliable manner.

The at least one opening cut into the foil by means of the punch member of the connecting port arrangement may be connected to a vacuum source or a liquid plastic material source of the apparatus for producing a composite material component via the channel extending through the base member. In this case, the punch member should be removed from the channel formed in the base member after cutting the at least one opening into the foil and prior to connecting the channel extending through the base member to the vacuum source or the liquid plastic material source. It is, however, also conceivable that a channel is formed in the punch member of the connecting port arrangement such that the at least one opening cut into the foil by means of the punch member is connectible to a vacuum source or a liquid plastic material source of the apparatus for producing a composite material component via the channel formed in the punch member. In other words, the at least one opening cut into the foil may be connected to the vacuum source or the liquid plastic material source while the punch member remains in place in the channel formed in the base member. The connecting port arrangement then may be connected to the vacuum source prior to cutting the opening into the foil, thus preventing air from the ambient atmosphere entering the mold through the opening cut into the foil.

The channel formed in the punch member may be sealed by a semipermeable membrane. The semipermeable membrane may allow air from passing therethrough, but may prevent liquid plastic material to pass therethrough. The at least one opening cut into the foil by means of the punch member then may be connected to a vacuum source via the channel extending through the punch member also during a running infusion or RTM process, since air may be drawn from the mold sealed by the foil via the at least one opening cut into the foil and the channel formed in the punch member, whereas liquid plastic material is prevented from exiting the mold. By drawing air from the mold during a running infusion or RTM process, dry regions within the mold may be filled with liquid plastic material, thus improving the distribution of the liquid plastic material within the mold. The punch member may further comprise a spring element which is adapted to automatically retract the cutting device from the opening cut into the foil by means of the cutting device so as to allow an unhindered air flow from the mold through the channel formed in the punch member. Further, instead of or in addition to the semipermeable membrane, a check valve may be provided in the punch member which allows air to be drawn from the mold sealed by the foil via the at least one opening cut into the foil, but which prevents air from entering the space sealed by means of the foil.

Moreover, the connecting port arrangement may comprise an insertion element which is adapted to be inserted into the channel formed in the base member after removing the punch member from the channel. The insertion element may comprise a channel extending therethrough, a semipermeable membrane allowing air to pass therethrough, but preventing liquid plastic material to pass therethrough, and/or a check valve allowing air to be drawn from the mold sealed by the foil via the at least one opening cut into the foil, but preventing air from entering the space sealed by means of the foil. Alternatively or additionally thereto, the insertion element may be provided with a perforated support structure. The perforated support structure may be adapted to be placed in the region of the opening cut into the foil by means of the punch member. The insertion element may be placed in the channel formed in the base member after removing the punch member from the channel and positioned such that the perforated support structure is arranged in the region of the opening cut into the foil. The perforated support structure may, for example, be designed in the form of a mesh structure or in the form of a perforated plate and prevents reinforcing fibers placed within the mold from being drawn in the direction of the opening cut into the foil when air is drawn from the mold via the opening. As a result, an undesired deformation, in particular an undesired bulging of a composite material component manufactured using the insertion element with the aid of the connecting port arrangement may be avoided.

The base member may comprise an attachment portion via which the base member is attached to the surface of the foil. Further, the base member may comprise a protruding portion protruding from the attachment portion in a direction facing away from the surface of the foil. The attachment portion may have a cross-sectional area that is larger than a cross-sectional area of the protruding portion. The channel extending through the base member may extend through both, the attachment portion and the protruding portion of the base member. The enlarged cross-sectional area of the attachment portion then may be used to reliably attach the base member to the surface of the foil, while the protruding portion may guide the movement of the punch member when being inserted into the channel extending through the base member.

The base member, in particular the protruding portion of the base member, may comprise a coupling device which is connectible to a connection element for connecting the at least one opening cut into the foil by means of the punch member of the connecting port arrangement to a vacuum source and/or a liquid plastic material source of the apparatus for producing a composite material component. The connection element may be a flexible connection element such as, for example, a hose. The coupling device may be any device which is suitable to provide a reliable connection between the base member and the connection element. For example, the coupling device may be designed in the form of a luer lock coupling element which is suitable for interacting with a complementary coupling element provided on the connection element.

The coupling between the at least one opening cut into the foil by means of the punch member and the connection element preferably is achieved via a coupling device provided on the base member independent of whether the at least one opening cut into the foil is coupled to the connection element via the channel formed in the base member or a channel extending through the punch member, since the base member, contrary to the punch member, is fixedly attached in place on the surface of the foil and may be coupled to the connection element in a safe and reliable manner. It is, however, also conceivable to provide the punch member with a coupling device which is connectible to a connection element for connecting the at least one opening cut into the foil by means of the punch member to a vacuum source and/or a liquid plastic material source of the apparatus for producing a composite material component, in particular in case the punch member should remain inserted in the channel extending through the base member, so that the at least one opening cut into the foil is connected to the vacuum source or the liquid plastic material source via a channel formed in the punch member.

The base member may comprise an attachment device for attaching the base member to the surface of the foil. The attachment device may comprise a first adhesive member which may, for example, be provided with two opposing tacky surfaces such that one tacky surface may be attached to the base member and the opposing tacky surface may be attached to the surface of the foil. In particular, the first adhesive member may be disposed in a recess formed in a surface of the base member which faces the surface of the foil. In particular, the recess may be formed in a surface of the attachment portion of the base member which faces the surface of the foil. The first adhesive member may be ring-shaped and may be arranged so as to extend around the channel formed in the base member.

Further, the attachment device for attaching the base member to the surface of the foil may comprise a suction port which his connectible to a vacuum source of the apparatus for producing a composite material component in order to generate a reduced pressure in a region between the surface of the base member which faces the surface of the foil and the surface of the foil so as to attach the base member to the surface of the foil. In other words, the attachment device may provide for a pressure driven attachment of the base member to the surface of the foil, thus allowing the base member to be relocated on the surface of the foil in a particularly flexible manner, if needed.

The suction port of the attachment device may comprise a coupling portion which is connectible to the vacuum source of the apparatus for producing a composite material component and which may extend from the base member, in particular the attachment portion of the base member in a direction facing away from the surface of the foil. Further, the suction portion may comprise a groove which is formed in the surface of the base member which faces the surface of the foil. In particular, the groove may be formed in the surface of the attachment portion of the base member which faces the surface of the foil. The groove may be ring-shaped and may extend around the channel formed in the base member. Finally, the suction port may comprise a channel portion connecting the coupling portion to the groove. The channel portion may extend through the attachment portion of the base element.

The coupling portion of the suction port may comprise a coupling device which is connectible to a further connection element for connecting the coupling portion of the suction port to the vacuum source of the apparatus for producing a composite material component. The further connection element may be a flexible connection element such as, for example, a hose. The coupling device of the coupling portion may, for example, be designed in the form of a luer lock coupling element which is adapted to interact with a complementary coupling element provided on the connection element.

The connecting port arrangement may further comprise a sealing element which is adapted to seal a space between the surface of the foil and the surface of the base member which faces the surface of the foil. The sealing element may, for example, comprise an O-ring seal which may be received in a groove formed in the surface of the base member, in particular the surface of the attachment portion of the base member, which faces the surface of the foil. In a preferred embodiment of the connecting port arrangement, the sealing element, however, is formed integral with the first adhesive member of the attachment device for attaching the base member to the surface of the foil. For example, the first adhesive member of the attachment device may be made of a flexible material thus allowing the first adhesive member to fulfil the double-function to attach the base member to the surface of the foil and to seal the space between the surface of the foil and the surface of the base member which faces the surface of the foil. As a further alternative, a sealing lip or the like may be provided on the first adhesive member for sealing the space between the surface of the foil and the surface of the base member which faces the surface of the foil. Moreover, a portion of the base member, for example the attachment portion of the base member or also the entire base member may be made of a flexible material suitable to seal the space between the surface of the foil and the surface of the base member which faces the surface of the foil. Alternatively or additionally thereto, a sealing lip or the like may be formed on the base member, in particular the attachment portion of the base member.

The cutting device of the punch member may comprise a cutting edge which is adapted to cut a single opening into the foil, in particular when the punch member is rotated relative to the base member when being inserted into the channel provided in the base member such that the cutting edge cuts into the foil. For example, the cutting edge may be substantially ring-shaped and extend from an end face of the punch member which faces the surface of the foil when the punch member is inserted into the channel provided in the base member. If desired, the cutting edge may be provided with cutting teeth. By means of the cutting edge, the cutting device may cut an opening into the foil which has a relatively large cross-sectional area allowing in particular liquid plastic material to pass therethrough in a reliable manner and without clogging.

Alternatively or additionally thereto, the cutting device of the punch member may comprise a plurality of pikes which are adapted to cut a plurality of openings into the foil, in particular when the punch member is displaced relative to the base member when being inserted into the channel provided in the base member in a direction towards the surface of the foil. By means of the pikes, the cutting device thus may cut a plurality of openings into the foil which have a small cross-sectional area allowing to maintain the integrity and thus the strength of the foil as far as possible.

Further, the punch member may be provided with an abutment portion which is adapted to interact with a complementary abutment portion provided on the base member in order to limit a movement of the punch member relative to the base member in the direction of the surface of the foil when the punch member is inserted into the channel formed in the base member. The abutment portion of the punch member, for example, may be formed by a flange portion radially extending outwards from an outer circumference of the punch member in the region of an end face of the punch member facing away from the surface of the foil when the punch member is inserted into the channel provided in the base member. The abutment portion provided on the base member may be formed by an end face of the protruding portion of the base member which faces away from the surface of the foil. By the interaction of the abutment portion of the punch member with the abutment portion provided on the base member, a reliable cutting process is ensured and unnecessarily damages to the foil and the reinforcing fibers arranged within the mold can be prevented.

The punch member may further comprise a second adhesive member being disposed in the region of the end face of the punch member which faces the surface of the foil when the punch member is inserted into the channel formed in the base member. The second adhesive member preferably is adapted to stick to a portion of the foil which is cut from the foil by means of the punch member. Hence, the portion of the foil which is cut from the foil can easily be removed so as to free the at least one opening cut into the foil by means of the punch member when the punch member is removed from the channel formed in the base member.

The connecting port arrangement may further comprise a positioning device which extends from the surface of the foil and which is adapted to protrude into the channel formed in the base member. The positioning device allows a desired position for attaching the base member to the foil to be marked. Further, the positioning device simplifies the attachment of the base member to the surface of the foil, since the positioning device protrudes into the channel formed in the base member and thus supports the base member in its position while the base member is attached to the surface of the foil.

The positioning device may comprise a preformed portion of the foil. In other words, the positioning device may be formed integral with the foil and may comprise, for example, a foil portion protruding from the residual foil. An opening may be cut into the foil in the region of the preformed foil portion by means of the punch member of the connecting port arrangement or in any other way. It is, however, also conceivable that the positioning device comprises an insert which is placed beneath the foil, i.e. adjacent to a surface of the foil which faces away from the base member. The foil thus may be sandwiched between the insert and the base member. The insert may, for example, be made of polytetrafluorethylene (PTFE).

The insert of the connecting port arrangement may comprise a first portion which is adapted to protrude into the channel formed in the base member. The first portion of the insert preferably is suitable to be cut together with the foil by means of the punch member. The first portion of the insert may be cut away entirely together with the cut foil portion and be removed from its position, for example, by means of the second adhesive member of the punch member. It is, however, also conceivable to provide the first portion of the insert with a plurality of openings or only one opening which extend(s) through the first portion of the insert upon cutting at least one opening into the foil by means of the punch member.

The insert may further comprise a second portion surrounding the first portion. Like the first portion of the insert, also the second portion of the insert, relative to the surface of the foil surrounding the insert, may protrude in the direction of the base member. However, the second portion of the insert preferably protrudes less in the direction of the base member than the first portion of the insert. The second portion of the insert may be used to support the base member, in particular the attachment portion of the base member when the base member is attached to the surface of the foil.

The insert may further comprise a third portion extending from a surface of the second portion of the insert in a direction facing away from the foil. Further, the insert may comprise a distribution port comprising a distribution line arranged adjacent to a surface of the first portion of the insert which faces away from the foil. The first portion of the insert thus may be sandwiched between the distribution line of the distribution port and the foil. Further, the distribution portion may comprise at least one connection channel extending from the distribution line in a direction facing away from the foil. An insert comprising a distribution port is particularly suitable for producing large composite material components, since the distribution line may extend below the foil and serve to distribute liquid plastic material within the mold. Preferably, the distribution port comprises a plurality of connection channels for uniformly distributing the liquid plastic material within the mold. When the foil and the first portion of the insert are cut by means of the punch member, the distribution line of the distribution port is made accessible, i.e. may be connected to a liquid plastic material source of the apparatus for producing a composite material component.

An apparatus for producing a composite material component, in particular a composite material aircraft component, comprises a mold. The mold may be suitable to receive reinforcing fibers and a liquid plastic material. Further, the apparatus comprises a connecting port arrangement as described above, i.e. a foil sealing the mold as well as a base member and a punch member. The apparatus may further comprise a vacuum source, a liquid plastic material source and at least one connection element for connecting the vacuum source and/or the liquid plastic material source to the connecting port arrangement, i.e. at least one opening cut into the foil by means of the punch member.

In a method for producing a composite material component, in particular a composite material aircraft component, a base member is attached to a surface of a foil which seals a mold of an apparatus for producing a composite material component. The base member is provided with a channel extending therethrough. At least one opening is cut into the foil by means of a punch member which is inserted into the channel formed in the base member and which is provided with a cutting device.

In the method for producing a composite material component, the at least one opening cut into the foil may be connected to a vacuum source of the apparatus for producing a composite material component. By means of the vacuum source, a reduced pressure may be generated within the mold sealed by the foil. Further, the at least one opening cut into the foil may be connected to a liquid plastic material source of the apparatus for producing a composite material component. Via the at least one opening cut into the foil, liquid plastic material may be supplied from the liquid plastic material source to the mold.

The punch member may be removed from the channel formed in the base member prior to connecting the at least one opening cut into the foil to the vacuum source or the liquid plastic material source of the apparatus for producing a composite material component. Alternatively, the at least one opening cut into the foil may be connected to the vacuum source of the apparatus for producing a composite material component via a channel which is formed in the punch member. The channel formed in the punch member may be sealed by a semipermeable membrane allowing air to pass therethrough, but preventing liquid plastic material to pass therethrough.

BRIEF DESCRIPTION OF THE DRAWINGS

Preferred embodiments of the invention now are described in greater detail with reference to the appended schematic drawings, wherein FIG. 4 shows still a further embodiment of a connecting port arrangement for use in an apparatus for producing a composite material component, FIG. 5 shows an exemplary embodiment of a coupling device provided on a base member of the connecting port arrangement according to any one of FIGS. 1 to 4, FIGS. 6a and 6b show a first embodiment of a positioning device of a connecting port arrangement for use in an apparatus for producing a composite material component, FIG. 7 shows a further embodiment of a positioning device of a connecting port arrangement for use in an apparatus for producing a composite material component, FIGS. 8a and 8b show still a further embodiment of a positioning device of a connecting port arrangement for use in an apparatus for producing a composite material component.

DETAILED DESCRIPTION OF THE PREFERRED EMBODIMENTS

Figure 1A:
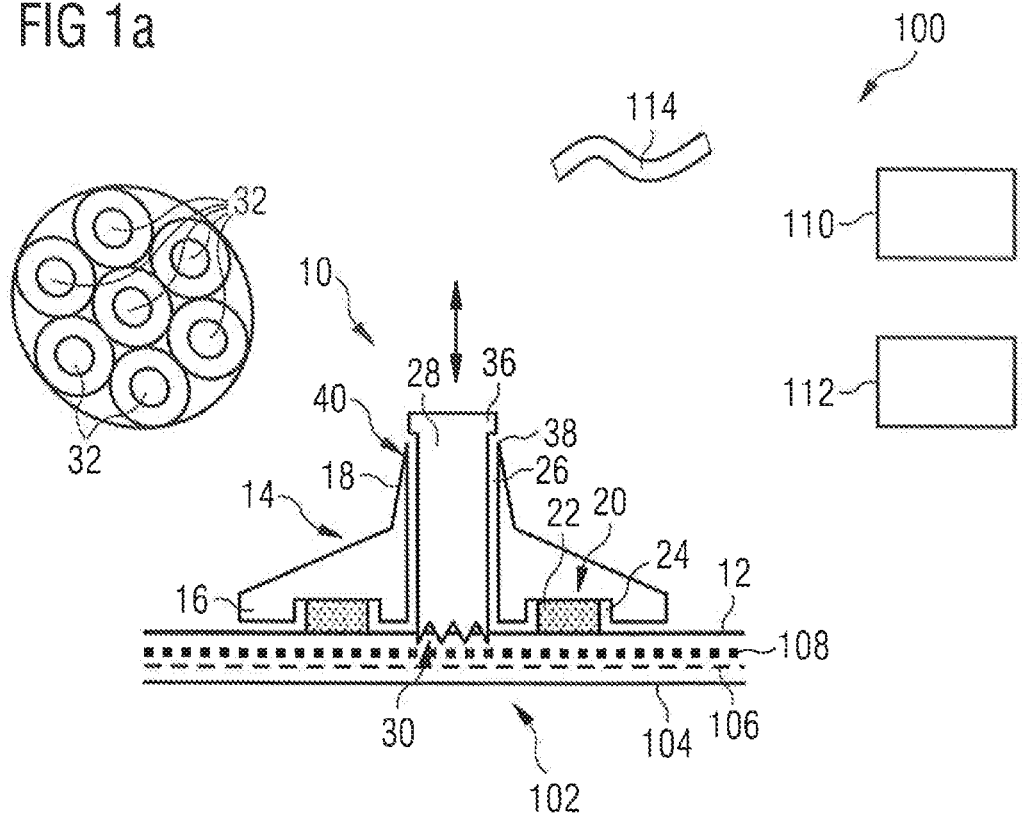
FIGS. 1a and 1b show a first embodiment of a connecting portion arrangement for use in an apparatus for producing a composite material component.
Figure 1B:
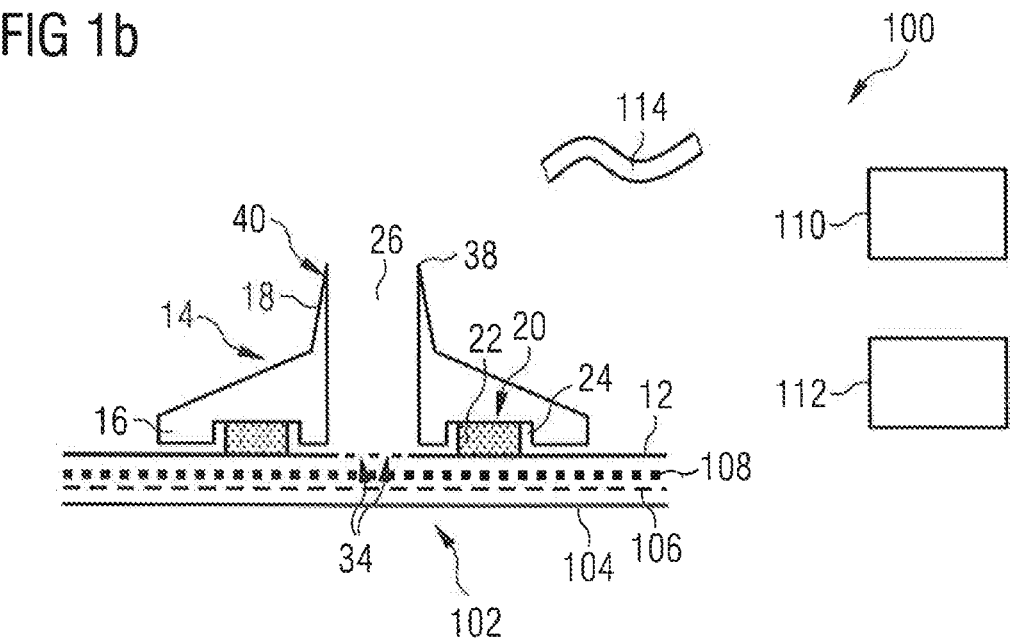

FIGS. 1a and 1b show a first embodiment of a connecting port arrangement 10 which is suitable for use in an apparatus 100 for producing a composite material component, in particular a composite material aircraft component. The apparatus 100 comprises a mold 102 which may be loaded with reinforcing fibers. Further, the mold 102 is adapted to receive a liquid plastic material, in particular a thermoset plastic material such as, for example, a resin material which may be cured within the mold, if necessary under an elevated pressure and/or an elevated temperature so as to obtain a composite material component with reinforcing fibers embedded within a matrix formed by the cured plastic material. The mold is covered by a peel ply 104, a perforated release foil 106 and a gating fabric tape 108. Further, the mold 102 is sealed by a foil 12. While the peel ply 104, the perforated release foil 106 and the gating fabric tape 108 are permeable to both air and liquid plastic material, the foil 12 is air-tight and also impermeable for liquid plastic material.

Beside the foil 12, the connecting port arrangement 10 comprises a base member 14 which may be attached to a surface of the foil 12 which faces away from the mold 102 at any desired location. The base member 14 is made of a plastic material which may be processed by injection molding and hence can be manufactured in a simple and cost-effective way. The base member 14 comprises an attachment portion 16 via which the base member 14 is attached to the surface of the foil 12 and a protruding portion 18 which protrudes from the attachment portion 16 in a direction facing away from the surface of the foil 12. The attachment portion 16 has a cross-sectional area which is larger than a cross-sectional area of the protruding portion 18.

The base member 14 is attached to the surface of the foil 12 by means of an attachment device 20 which, in the embodiment of a connecting port arrangement 10 depicted in FIGS. 1a and 1b, comprises a first adhesive member 22 which is disposed in a recess 24. The recess 24 is formed in a surface of the base member 14, in particular a surface of the attachment portion 16 of the base member 14, which faces the surface of the foil 12. The ring-shaped first adhesive member 22 is provided with two opposing tacky surfaces, such that one tacky surface of the first adhesive member 22 sticks to the attachment portion 16 of the base member and the opposing tacky surface of the first adhesive member 22 sticks to the surface of the foil 12 so as to fix the base member 14 in place on the surface of the foil 12.

The base member 14 is provided with a channel 26 which extends through the base member 14, i.e. through both the attachment portion 16 and the protruding portion 18 of the base member 14 in a direction substantially perpendicular to the surface of the foil 12. The connecting port arrangement 10 further comprises a punch member 28 which is adapted to be inserted into the channel 26 formed in the base member 14, see FIG. 1a. In the region of an end face which faces the surface of the foil 12 when the punch member 28 is inserted into the channel 26 formed in the base member 14, the punch member 28 is provided with a cutting device 30.

As becomes apparent from the detailed top view of the end face of the punch member 28 depicted in FIG. 1a, the cutting device 30, in the embodiment of a connecting port arrangement 10 according to FIGS. 1a and 1b, comprises a plurality of pikes 32 which protrude from the end face of the punch member 28 in the direction of the surface of the foil 12 when the punch member 28 is inserted into the channel 28 formed in the base member 14. By displacing the punch member 28 relative to the base member 14 in a direction towards the surface of the foil 12, the punch member 28, i.e. the cutting device 30 of the punch member 28, thus may cut the foil 12. In particular, the cutting device 30 of the punch member 28 which comprises a plurality of pikes 32, in the connecting port arrangement 10 of FIGS. 1a and 1b, is suitable to cut a plurality of relatively small-sized openings 34 into the foil 12, see FIG. 1b.

The punch member 28 further is provided with an abutment portion 36 formed by a flange portion which, in the region of an end face of the punch member 28 which faces away from the foil 12 when the punch member 28 is inserted into the channel 28 provided in the base member 14, extends radially outwards with respect to a circumferential surface of the punch member 28. When the punch member 28 is moved relative to the base member 14 in the direction of the surface of the foil 12 so as to cut the openings 24 into the foil 12, the movement of the punch member 28 relative to the base member 14 is limited by the interaction of the abutment portion 36 of the punch member 28 with a complementary abutment portion 38 which is formed on the protruding portion 18 of the base member 14 in the region of an end face thereof which faces away from the foil 12. By the interaction of the abutment portion 36 of the punch member 28 with the complementary abutment portion 38 formed on the protruding portion 18 of the base member 14, the cutting process performed by the punch member 28 is guided in a reliable manner. In particular, it is prevented that the punch member 28 is inserted too far into the channel 26 of the base member 14. As a result, damages to the peel ply 104, the perforated release foil 106 and the gating fabric tape 108 as well as damages to reinforcing fibers arranged within the mold 102 are reliably prevented.

In the embodiment of a cutting port arrangement 10 according to FIGS. 1a and 1b, the punch member 28, after cutting the plurality of openings 34 into the foil 12, is removed from the channel 26 formed in the base member 14. The openings 34 then may be connected to a vacuum source 110 in the form of, for example, a vacuum pump, which allows air to be drawn from the mold 102 either prior to supplying liquid plastic material into the mold 12 or after the mold 102 is filled with liquid plastic material and while the plastic material is cured within the mold 102. Alternatively, the openings 34 may be connected to a liquid plastic material source 112 such that the mold 102 may be filled with liquid plastic material from the liquid plastic material source 112 via the openings 34.

The coupling of the vacuum source 110 or the liquid plastic material source 112 to the openings 34 may be achieved by means of a connection element 114. The connection element 114 may be a flexible connection element and may, for example, be provided in the form of a hose. In particular, the connection element 114 may be coupled to a coupling device 40 which is formed on the base member 14, in particular on the protruding portion 18 of the base member 14. An exemplary embodiment of a coupling device 40 which may be provided on the protruding portion 18 of the base member 14 is depicted in FIG. 5. In particular, the coupling device 40 provided on the protruding portion 18 of the base member 14 may be suitable to interact with a complementary coupling device 42 provided on the connection element 114. By means of the coupling device 40 and the complementary coupling device 42, the coupling between the base member 14 and thus the openings 34 cut into the foil 12 to the connection element 114 and hence the vacuum source 110 or the liquid plastic material source 112 may be achieved in a fast and reliable manner.

The first adhesive member 22 is formed of an elastic material and hence is suitable to seal a space between the surface of the base member 14 which faces the surface of the foil 12 and the surface of the foil 12. The first adhesive member 22 thus fulfils the double-function of attaching the base member 14 to the foil 12 and sealing the space between the surface of the base member 14 which faces the surface of the foil 12 and the surface of the foil 12. As a result, air can be drawn from the mold 102 or liquid plastic material can be introduced into the mold 102 in a reliable manner without air and liquid plastic material, respectively, leaking from the space between the surface of the foil 12 and the surface of the base member 14.

Figure 2:
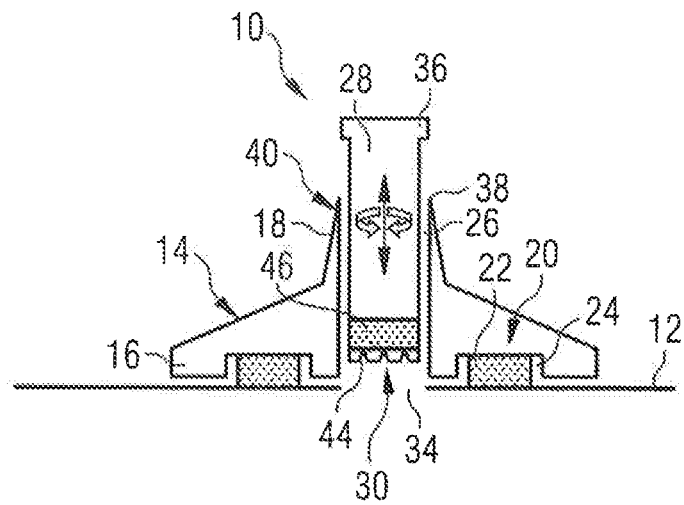
FIG. 2 shows a further embodiment of a connecting port arrangement for use in an apparatus for producing a composite material component.

The embodiment of a connecting port arrangement 10 shown in FIG. 2 differs from the arrangement according to FIGS. 1a and 1b in that the cutting device 30 of the punch member 28 no longer comprises a plurality of pikes, but a cutting edge 44 which is adapted to cut a single opening 34 into the foil 12. In particular, the cutting edge 44 comprises a plurality of cutting teeth and extends from the end face of the punch member 28 which faces the foil 12 when the punch member 28 is inserted into the channel 26 formed in the base member 14 in a circumferential region thereof. The cutting action, by means of the punch member 28, thus may be performed by both displacing the punch member 28 relative to the base member 14 in a direction of a foil 12 and by simultaneously rotating the punch member within the channel 26 of the base member 14.

Further, the punch member 28 of the connecting port arrangement 10 according to FIG. 2 comprises a second adhesive member 46 which is disposed in the region of the end face of the punch member 28 which faces the foil 12 when the punch member 28 is inserted into the channel 26 formed in the base member 14. The second adhesive member 46 comprises a tacky surface which is adapted to stick to a portion of the foil 12 which is cut from the foil 12 by means of the punch member 28. Hence, the cut portion of the foil 12 may be removed together with the punch member 28 in a simple manner upon withdrawing the punch member 28 from the channel 26 formed in the base member 14. Otherwise, the structure and the function of the connecting port arrangement 10 of FIG. 2 correspond to the structure and the function of the connecting port arrangement 10 depicted in FIGS. 1a and 1b.

Figure 3:
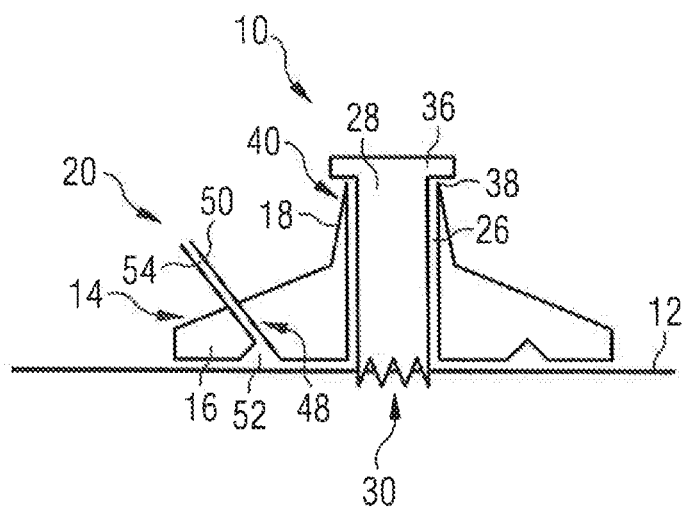
FIG. 3 shows still a further embodiment of a connecting port arrangement for use in an apparatus for producing a composite material component.

The connecting port arrangement 10 according to FIG. 3 differs from the arrangement according to FIGS. 1a and 1b in that the attachment device 20 for attaching the base member 14 to the surface of the foil 12 no longer comprises a first adhesive member 22. Instead, the attachment device 20, in the connecting port arrangement 10 of FIG. 3, comprises a suction port 48 which is connectible to the vacuum source 110 of the apparatus 100 in order to generate a reduced pressure in a region between the surface of the base member 14, i.e. the surface of the attachment portion 16 of the base member 14, which faces the surface of the foil 12 and the surface of the foil 12 so as to attach the base member 14 to the surface of the foil 12. In particular, the suction port 48 comprises a coupling portion 50 which protrudes from the attachment portion 16 of the base member 14 and which is connectible to the vacuum source 110. The coupling portion 50 may comprise a coupling device as shown, for example, in FIG. 5 which allows the coupling portion 50 of the suction port 40 to be connected to a connection element 114 connecting the suction port 48 to the vacuum source 110.

Further, the suction port 48 comprises a groove 52 formed in the surface of the base member 14, i.e. the attachment portion 16 of the base member 14, which faces the surface of the foil 12. The groove 52 is substantially ring-shaped and extends around the channel 26 formed in the base member 14. Finally, the suction port 48 comprises a channel portion 54 which extends through the attachment portion 16 of the base member and which connects the groove 52 to the coupling portion 50. Otherwise, the structure and the function of the connecting port arrangement 10 of FIG. 3 correspond to the structure and the function of the connecting port arrangement 10 depicted in FIGS. 1a and 1b.

In the connecting port arrangement 10 according to FIG. 4, a channel 56 is formed in the punch member 28. The channel 28 extends through the punch member 28, i.e. the punch member 28 has a generally hollow-cylindrical shape. A semipermeable membrane 58 which allows air to pass therethrough, but prevents liquid plastic material to pas therethrough is provided in the channel 56. After cutting a plurality of openings 34 into the foil 12, in the connecting port arrangement 10 according to FIG. 4, the punch member 28 remains in place in the channel 26 formed in the base member 14. Thus, the base member 14, via the coupling device 40 formed on the protruding portion 18 of the base member 14, may be connected to the vacuum source 110 of the apparatus 100 with the punch member 28 being inserted in the channel 26 of the base member 14.

Since the semipermeable membrane 58 allows air to pass therethrough, but is impermeable to liquid plastic material, the connecting port arrangement 10 according to FIG. 4 may be used to draw air from the mold 102 during a running liquid plastic material injection process or while liquid plastic material introduced into the mold 102 is cured. Otherwise, the structure and the function of the connecting port arrangement 10 according to FIG. 4 correspond to the structure and the function of arrangement depicted in FIGS. 1a and 1b.

Figure 6A:
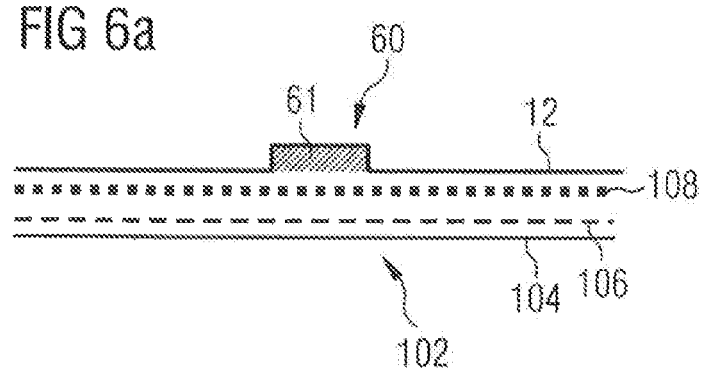
Figure 6B:
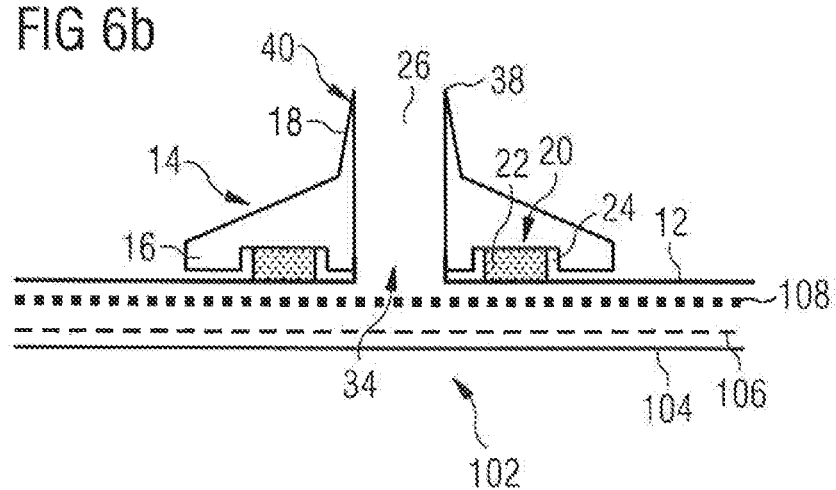

FIGS. 6a and 6b show an embodiment of a connecting port arrangement 10 which differs from the arrangement according to FIGS. 1a and 1b in that a positioning device 60 is provided which extends from the surface of the foil 12 and which is adapted to protrude into the channel 26 formed in the base member 14. The positioning device 60 thus may be used for marking a desired position on the surface of the foil 12 at which the base member 14 should be attached to the foil 12. In the embodiment of a connecting port arrangement 10 as depicted in FIGS. 6a and 6b, the positioning device 60 comprises a preformed portion of the foil 12, i.e. a portion of the foil 12 which protrudes from the residual foil 12. The preformed portion of the foil 12 may, for example, be formed in a thermal forming process. Otherwise, the structure and the function of the connecting port arrangement 10 according to FIGS. 6a and 6b correspond to the structure and the function of the arrangement depicted in FIGS. 1a and 1b.

FIG. 7 shows an alternative embodiment of a positioning device 60 which now comprises an insert 62 placed adjacent to a surface of the foil 12 which faces away from the base member 14. The insert 62 comprises only a first portion 64, is made of PTFE and may be provided with a plurality of openings extending therethrough when the foil 12 is cut by means of a punch member 28, the cutting device 30 of which is provided with a plurality of pikes 32 as depicted in FIGS. 1a and 1b. Alternatively, the insert 62 may also be completely cut away and removed when a single large-sized opening 34 is cut into the foil 12, for example by means of a punch member 28 comprising a cutting edge 44 as depicted in FIG. 2.

FIGS. 8a and 8b show a further alternative positioning device 60, wherein the insert 62 comprises a first portion 64 which, like the insert 62 depicted in FIG. 7, may be provided with openings or may be cut away and removed when at least one opening 34 is cut into the foil 12, see FIG. 8b. Further, the insert 62 comprises a second portion 66. The second portion 66 is substantially ring-shaped and surrounds the first portion 64. The second portion 66 of the insert 62 protrudes in a direction of the base member 12, but less than the first portion 64. The second portion 66 remains in place also after the at least one opening 34 is cut into the foil 12 and the first portion 64 of the insert 62 is optionally removed and thus may serve to support the attachment portion 16 of the base member 14. Hence, the second portion 66 of the insert 62 allows stabilizing the base member 14 in its position when being attached to the surface of the foil 12.

Figure 9:
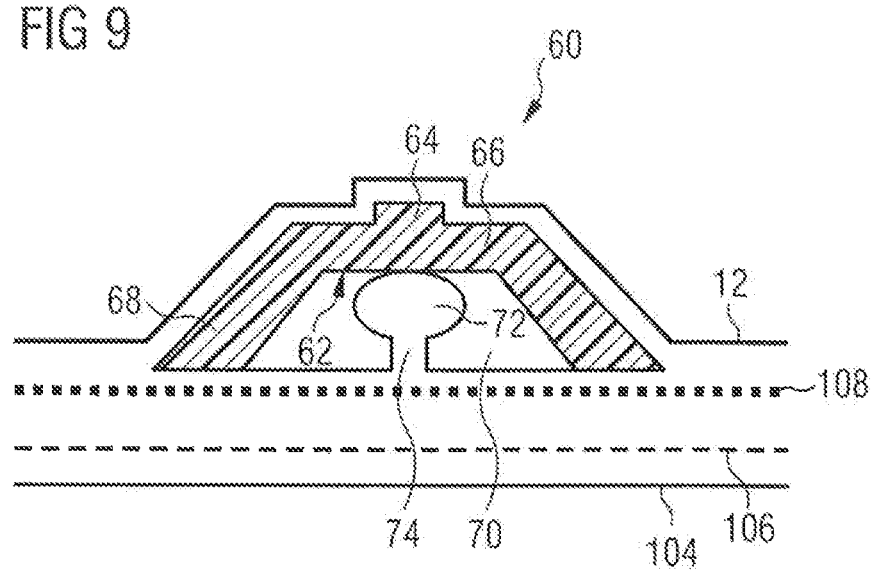
FIG. 9 shows still a further embodiment of a positioning device of a connecting port arrangement for use in an apparatus for producing a composite material component.

FIG. 9 shows a further embodiment of a positioning device 60, wherein the insert 62, beside a first portion 64 and a second portion 66, comprises a third portion 68 extending from a surface of the second portion 66 in a direction facing away from the foil 12. The insert 62 further comprises a distribution port 70 which serves to distribute liquid plastic material to be supplied into the mold 102 within the mold 102. In particular, the distribution port 70 comprises a distribution line 72 arranged adjacent to a surface of the first portion 64 which faces away from the foil 12. The distribution line 72 is connected to a plurality of connection channels 74 which extend from the distribution line 72 in a direction facing away from the foil 12 and which serve to supply liquid plastic material supplied to the distribution line 72 into the mold 102 at different locations.

An insert 62 comprising a distribution port 70 is particularly suitable for use in an apparatus 100 for producing large composite material components such as, for example, composite material aircraft components. The distribution port 70, i.e. the distribution line 72 of the distribution port 70, may be made accessible by either cutting a plurality of openings into the foil 12 and the first portion 64 of the insert 62 or by cutting a large opening 34 into the foil 12 and by removing the first portion 64 of the insert 62 as depicted in FIGS. 8a and 8b.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A connecting port arrangement for use in an apparatus for producing a composite material component, the connecting port arrangement comprising:
   a base member attached to a surface of a foil adapted to seal a mold of the apparatus for producing a composite material component, and being provided with a channel extending therethrough, and
   a punch member adapted to be inserted into the channel formed in the base member, and being is provided with a cutting device suitable to cut at least one opening into the foil,
   wherein the cutting device of the punch member comprises at least one of:
      a cutting edge adapted to cut a single opening into the foil when the punch member is rotated relative to the base member when being inserted into the channel provided in the base member such that the cutting edge cuts into to the foil, and
      a plurality of pikes adapted to cut a plurality of openings into the foil when the punch member is displaced relative to the base member when being inserted into the channel provided in the base member in a direction towards the surface of the foil.

2. The connecting port arrangement according to claim 1, wherein a channel is formed in the punch member, the channel being sealed by a semipermeable membrane allowing air to pass therethrough, but preventing liquid plastic material from passing therethrough.

3. The connecting port arrangement according to claim 1, wherein the base member comprises an attachment portion via which the base member is attached to the surface of the foil and a protruding portion protruding from the attachment portion in a direction facing away from the surface of the foil, the protruding portion comprising a coupling device connectible to a connection element for connecting the at least one opening cut into the foil to at least one of a vacuum source and a liquid plastic material source of the apparatus for producing a composite material component.

4. The connecting port arrangement according to claim 1, wherein an attachment device for attaching the base member to the surface of the foil comprises at least one of:
- a first adhesive member, the first adhesive member being disposed in a recess formed in a surface of the base member facing the surface of the foil, and
- a suction port connected to a vacuum source of the apparatus for producing a composite material component in order to generate a reduced pressure in a region between the surface of the base member which faces the surface of the foil and the surface of the foil, so as to attach the base member to the surface of the foil.

5. The connecting port arrangement according to claim 4, wherein the suction port comprises at least one of:
- a coupling portion connectible to the vacuum source of the apparatus for producing a composite material component,
- a groove formed in the surface of the base member facing the surface of the foil, and
- a channel portion connecting the coupling portion to the groove.

6. The connecting port arrangement according to claim 1, further comprising a sealing element adapted to seal a space between the surface of the foil and the surface of the base member which faces the surface of foil, the sealing element being formed integral with a first adhesive member of an attachment device for attaching the base member to the surface of the foil.

7. The connecting port arrangement according to claim 1, wherein the punch member is provided with an abutment portion adapted to interact with a complementary abutment portion provided on the base member to limit a movement of the punch member relative to the base member in the direction of the surface of the foil when the punch member is inserted into the channel formed in the base member.

8. The connecting port arrangement according to claim 1, wherein the punch member comprises a second adhesive member disposed in a region of an end face of the punch member facing the surface of the foil when the punch member is inserted into the channel formed in the base member, the second adhesive member being adapted to stick to a portion of the foil which is cut from the foil via the punch member.

9. The connecting port arrangement according to claim 1, further comprising a positioning device extending from the surface of the foil and being adapted to protrude into the channel formed in the base member.

10. The connecting port arrangement according to claim 9, wherein the positioning device comprises at least one of:
- a preformed portion of the foil, and
- an insert placed adjacent to a surface of the foil facing away from the base member.

11. The connecting port arrangement according to claim 10, wherein the insert comprises at least one of:
- a first portion adapted to protrude into the channel formed in the base member,
- a second portion surrounding the first portion,
- a third portion extending from a surface of the second portion in a direction facing away from the foil, and
- a distribution port comprising a distribution line arranged adjacent to a surface of the first portion facing away from the foil and at least one connection channel extending from the distribution line in a direction facing away from the foil.

12. An apparatus for producing a composite material component, the apparatus comprising:
- a mold, and
- a connecting port arrangement according to claim 1.

13. A method for producing a composite material component, the method comprising the steps:
- attaching a base member to a surface of a foil sealing a mold of an apparatus for producing a composite material component, the base member provided with a channel extending therethrough, and
- cutting at least one opening into the foil with a punch member which is inserted into the channel formed in the base member and which is provided with a cutting device, wherein the cutting device of the punch member comprises at least one of:
  - a cutting edge adapted to cut a single opening into the foil when the punch member is rotated relative to the base member when being inserted into the channel provided in the base member such that the cutting edge cuts into to the foil, and
  - a plurality of pikes adapted to cut a plurality of openings into the foil when the punch member is displaced relative to the base member when being inserted into the channel provided in the base member in a direction towards the surface of the foil.

14. The method of claim 13, further comprising the step:
connecting the at least one opening cut into the foil to a vacuum source of the apparatus for producing a composite material component and generating a reduced pressure within the mold sealed by the foil by means of the vacuum source.

15. The method of claim 13, further comprising the step:
connecting the at least one opening cut into the foil to a liquid plastic material source of the apparatus for producing a composite material component and supplying liquid plastic material from the liquid plastic material source to the mold via the at least one opening cut into the foil.

16. The method of claim 14, including the step of removing the punch member from the channel formed in the base member prior to connecting the at least one opening cut into the foil to the vacuum source of the apparatus for producing a composite material component.

17. The method of claim 15, including the step of removing the punch member from the channel formed in the base member prior to connecting the at least one opening cut into the foil to the liquid plastic material source of the apparatus for producing a composite material component.

18. The method of claim 14, wherein the at least one opening cut into the foil is connected to the vacuum source of the apparatus for producing a composite material component via a channel which is formed in the punch member, the channel being sealed by a semipermeable membrane allowing air to pass therethrough, but preventing liquid plastic material to pass therethrough.

* * * * *